United States Patent [19]

Choi

[11] Patent Number: 5,576,842
[45] Date of Patent: Nov. 19, 1996

[54] DATA DETECTION METHOD AND APPARATUS THEREFOR FOR USE IN A DIGITAL RECORDING/REPRODUCTION SYSTEM

[75] Inventor: Kyung-hwan Choi, Suwon, Rep. of Korea

[73] Assignee: Samsung Electronics Co., Ltd., Kyungki-do, Rep. of Korea

[21] Appl. No.: 483,842

[22] Filed: Jun. 7, 1995

[30]    Foreign Application Priority Data

Dec. 19, 1994 [KR] Rep. of Korea ............... 94-35069

[51] Int. Cl.$^6$ ................................. H04N 5/92
[52] U.S. Cl. ................. 386/46; 360/32; 386/90
[58] Field of Search ................ 360/32, 38.1; 358/335, 358/337, 339, 327, 320

[56]    References Cited

U.S. PATENT DOCUMENTS

| | | | |
|---|---|---|---|
| 3,979,721 | 9/1976 | Umemmoto et al. | 340/146.1 |
| 4,065,795 | 12/1977 | Shutterly | 360/35 |
| 4,591,898 | 5/1986 | DeBoer et al. | 358/36 |
| 4,677,621 | 6/1987 | Sato et al. | 371/30 |
| 4,698,811 | 10/1987 | Eto et al. | 371/38 |
| 4,849,830 | 7/1989 | Kim | 360/10.1 |
| 5,043,825 | 8/1991 | Heitmann et al. | 358/312 |
| 5,317,414 | 5/1994 | Shindo et al. | 358/336 |
| 5,398,114 | 3/1995 | Han | 358/336 |
| 5,418,656 | 5/1995 | Fukazawa et al. | 360/38.1 |
| 5,469,306 | 11/1995 | Hara | 360/65 |

*Primary Examiner*—Thai Q. Tran
*Assistant Examiner*—Luanne P. Din
*Attorney, Agent, or Firm*—Sughrue, Mion, Zinn, Macpeak & Seas

[57]    ABSTRACT

An apparatus for use in a digital recording/reproducing system includes a first comparator for receiving a reproduced analog signal, comparing the voltage level thereof with a first reference voltage of a predetermined level, and outputting a first comparison result; a switch for switching on and off a connection with the reproduced analog signal in accordance with the first comparison result; a reference voltage adjuster for charging or discharging a charge element in accordance with the on/off state of the switch in the switch, and adjusting a second reference voltage of a predetermined level for data detection; a second comparator for receiving a reproduced analog signal, comparing the voltage level thereof with the second reference voltage adjusted in the reference voltage adjuster, and outputting a second comparison result; and a restorer for receiving the second comparison result, synchronizing the received result with a clock signal, and restoring the synchronized signal into a digital signal. A data detection method reduces the probability of error generation due to time-axis motion of signals, by adjusting the reference voltage in accordance with input signals.

3 Claims, 6 Drawing Sheets

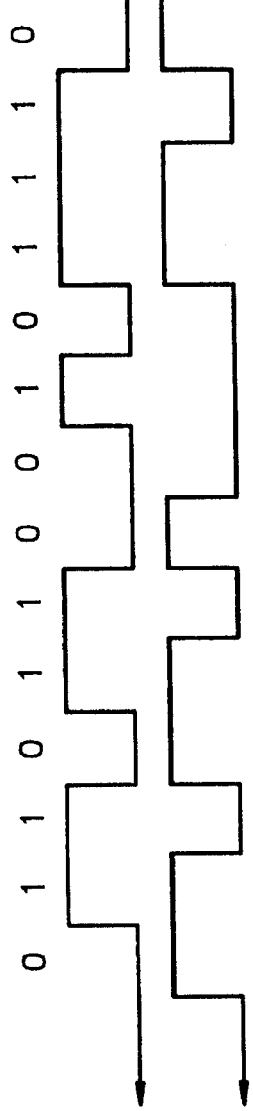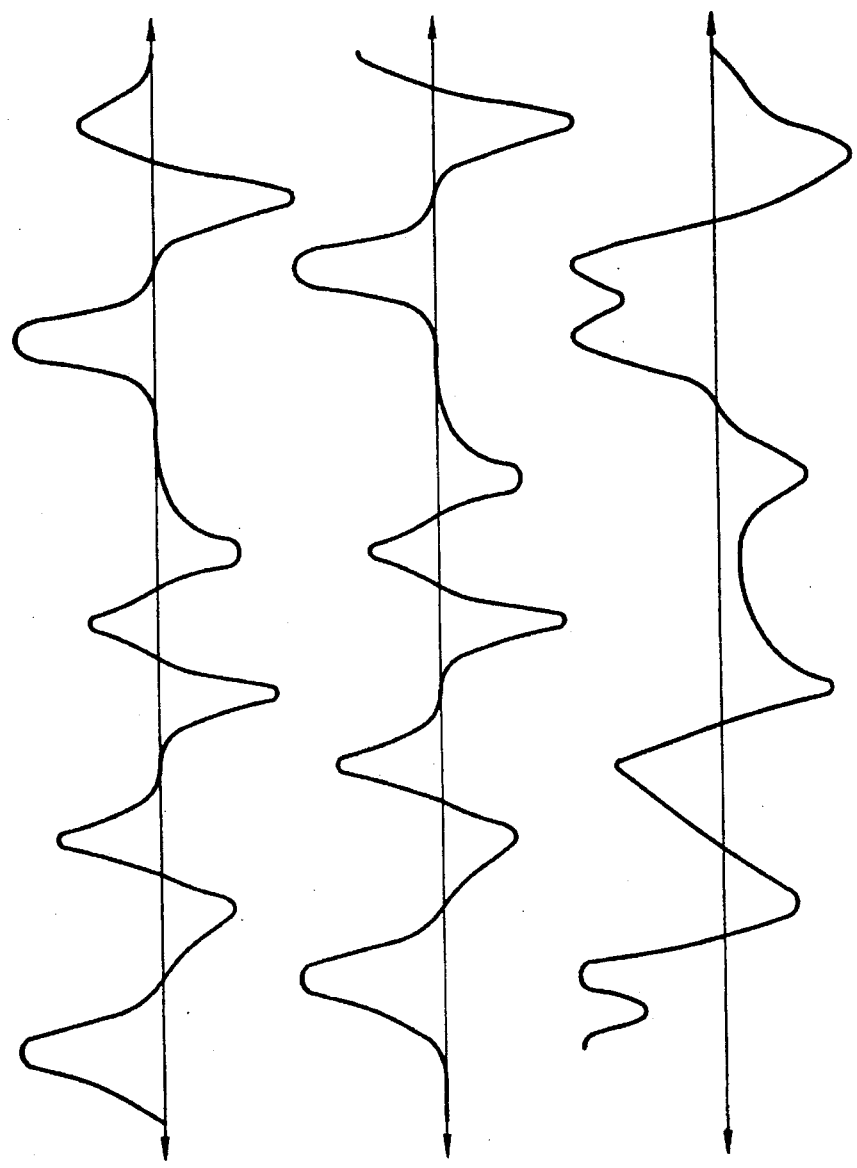
FIG. 2A (PRIOR ART)
FIG. 2B (PRIOR ART)
FIG. 2C (PRIOR ART)
FIG. 2D (PRIOR ART)
FIG. 2E (PRIOR ART)

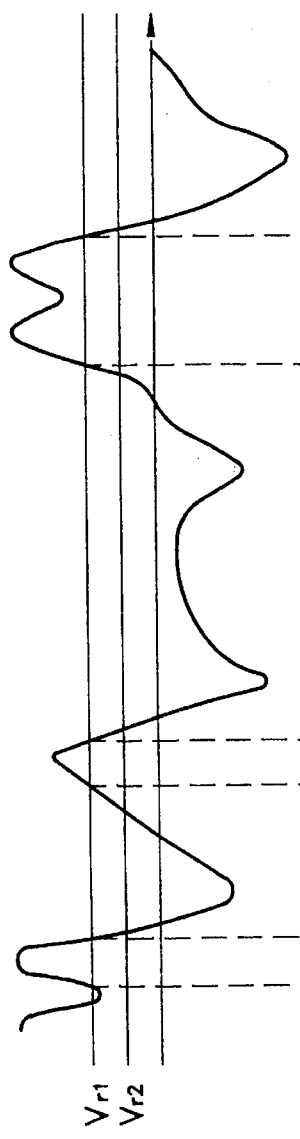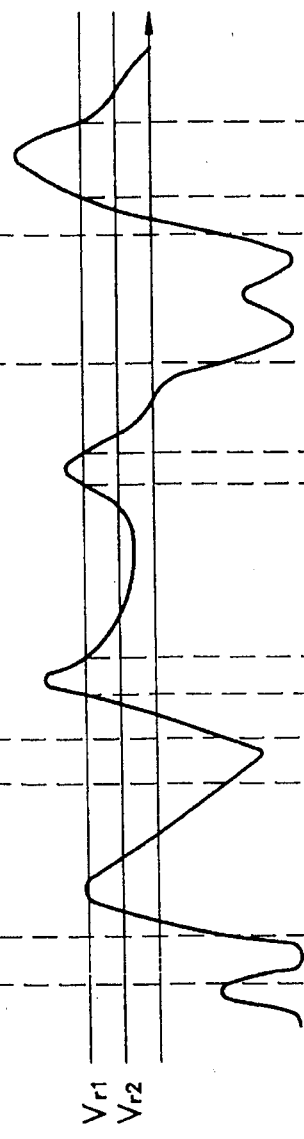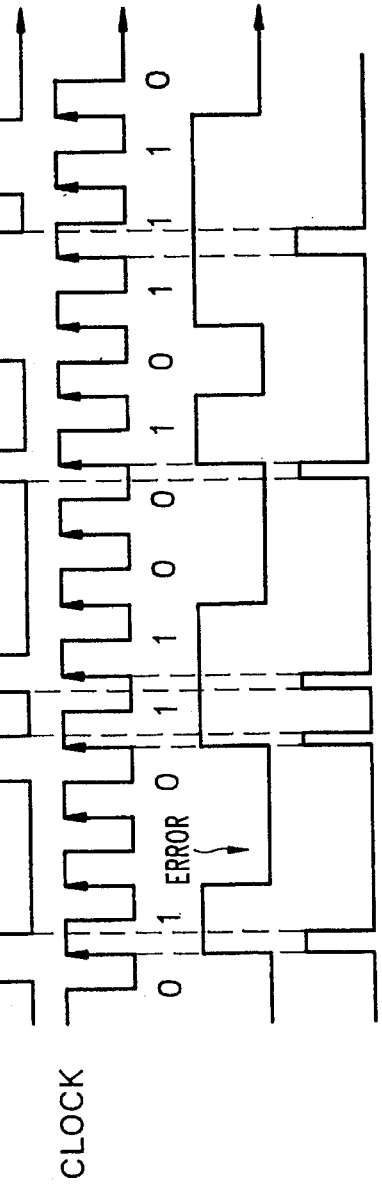
FIG. 2F (PRIOR ART)
FIG. 2G (PRIOR ART)
FIG. 2H (PRIOR ART)
FIG. 2I (PRIOR ART)
FIG. 2J (PRIOR ART)

DATA DETECTION METHOD AND APPARATUS THEREFOR FOR USE IN A DIGITAL RECORDING/REPRODUCTION SYSTEM

BACKGROUND OF THE INVENTION

The present invention relates to a system for recording and reproducing video and audio signals as digital signals, and more particularly, to a data detection method and apparatus thereof for use in a digital recording/reproducing system having a reference voltage adjustment unit for adjusting the reference voltage of a data detector in order to reproduce the recorded digital signal accurately.

A conventional digital recording/reproducing system records a signal onto a recording medium in the form of digital data. During a reproducing operation, an analog signal is picked up from the recording medium and is converted into the original digital data through the data detector.

FIG. 1 is a block diagram of a conventional data detection apparatus for use in a digital recording/reproducing system, for example, a non-return-to-zero inverted (NRZI) system.

Referring to FIG. 1, in recording data, the signal a to be recorded and the signal passed through a pre-coder 1 are summed in an adder 2 and are recorded onto the recording medium in the form of digital data by means of a recording head 5 via a recording equalizer 3 and a recording amplifier 4. At this time, pre-coder 1 performs a coding operation for preventing errors from being propagated.

When reproducing the signal recorded as described above, the data recorded onto the recording medium is read out as an analog signal by means of a pickup device such as a reproduction head 6. The read signal is amplified in a reproduction amplifier 7, and the analog signal is compensated through a reproduction equalizer 8. Adder 10 sums the output signal of reproduction equalizer 8 and the signal obtained by delaying the output signal of reproduction equalizer 8 by one clock cycle through delay 9 and then outputs the result to a data detector 20. In data detector 20, analog data is converted into digital data to then be output. The reproduction signal compensated in reproduction equalizer 8 is output to PLL 11. PLL 11 generates a clock signal whose phase is controlled and outputs the clock signal to the clock port of D flip-flop 25.

The conventional data detector 20 is constituted by a differential amplifier 21, first and second comparators 22 and 23, an OR gate 24 and a D flip-flop (F/F) 25.

Now, the operation of the thus-constituted data detector will be described.

First, the output signal e from adder 10 is input to differential amplifier 21. Then, the signal f having the same phase as the signal e is output via the non-inverting output port (+) of differential amplifier 21 and a signal g whose phase is inverted with respect to the input is output via the inverting output port (−). These signals f and g are input to the non-inverting input ports of first and second comparators 22 and 23, respectively, and a reference voltage $V_r$ is applied to the inverting input ports. Then, first comparator 22 compares the magnitude of the input signal f and the reference voltage $V_r$. If the input signal f is larger than the reference voltage $V_r$, a logic "high" is output, and if the input signal f is smaller than the reference voltage $V_r$, a logic "low" is output. Similarly, second comparator 23 compares the magnitude of the input signal g and the reference voltage $V_r$, to output a digital signal accordingly. OR gate 24 receives the outputs of the first and second comparators 22 and 23, performs an OR operation with respect thereto, and outputs a digital signal h to D flip-flop 25. D flip-flop 25 synchronizes the output of OR gate 24 with the clock of a clock counter constituted by a phase-locked loop (PLL) 11, to reproduce a digital signal i.

FIGS. 2A to 2M are operational waveforms of various parts for explaining the flow of signals shown in FIG. 1. FIG. 2A shows an input signal to be recorded, i.e., digital data corresponding to the signal a in FIG. 1. FIG. 2B shows a signal produced by summing the input signal a and the output of pre-coder 1, i.e., the signal b in FIG. 1.

FIG. 2C shows a signal produced by compensating the reproduced analog signal by means of reproduction equalizer 8, which corresponds to the signal c in FIG. 1. FIG. 2D shows the signal produced by delaying the output signal of reproduction equalizer 8 by means of delay 9, which corresponds to the signal d in FIG. 1. FIG. 2E shows a signal produced by summing the output signal of reproduction equalizer 8 and the output of delay 9, corresponding to the signal e in FIG. 1.

FIGS. 2F and 2G show input signals of each non-inverting input port of first and second comparators 22 and 23 shown in FIG. 1 and illustrate each magnitude of a first reference voltage $V_{r1}$ and a second reference voltage $V_{r2}$.

FIG. 2H shows an output signal h from OR gate 24 shown in FIG. 1, when the reference voltages of first and second comparators 22 and 23 are the first reference voltage $V_{r1}$, where a clock signal is an output of PLL 11 shown in FIG. 1.

FIG. 2I shows a signal i reproduced from D flip-flop 25 shown in FIG. 1, when the reference voltages of first and second comparators 22 and 23 are the first reference voltage $V_{r1}$.

FIG. 2J shows a pulse having an error margin of 25% with respect to jitter of the clock signal when the reference voltage is the first reference voltage $V_{r1}$.

As shown in FIGS. 2H to 2J, the reproduced signal i has an error generated in a third bit. At this time, in view of the error margin, since the pulse widths of the second, third and fourth error margins are comparatively small, the probability of an error generation is high.

FIG. 2K shows the output of OR gate 24 when the reference voltages of first and second comparators 22 and 23 are $V_{r2}$.

FIG. 2L shows a signal i reproduced from D flip-flop 25 shown in FIG. 1 when the reference voltages of first and second comparators 22 and 23 are first reference voltage $V_{r2}$, where the oblique-lined fourth bit may be a logic "high" or a logic "low."

FIG. 2M shows a pulse having an error margin of 25% for jitter of the clock signal for the case of the reference voltage $V_{r2}$, where a first error margin is nearly zero, as understood by its narrow pulse width, and the pulse widths of error margins are narrow on the average.

As described above, in a digital recording/reproduction system, the conventional data detection method has a considerably high probability of error generation. Also, the error generation is very sensitive to jitter of the reproduced signal and clock, due to time-axis variation.

SUMMARY OF THE INVENTION

Therefore, in order to solve the above problems, it is an object of the present invention to provide a method for detecting data and apparatus therefor, by adjusting a reference voltage of a data detector in accordance with an input signal in a digital recording/reproduction system.

To accomplish the above object, the data detection method for use in a digital recording/reproduction system according to the present invention, comprises the steps of: (a) receiving a reproduced analog signal, comparing the voltage level thereof with a first reference voltage of a predetermined level and outputting a first comparison result; (b) switching on and off a switch connected with the reproduced analog signal in accordance with the first comparison result output in the step (a); (c) charging or discharging an input voltage in accordance with the on/off state of the switch in the step (b) and adjusting a second reference voltage of a predetermined level for data detection; (d) receiving the reproduced analog signal, comparing the voltage level thereof with the second reference voltage adjusted in the step (c) and outputting a second comparison result; and (e) receiving the second comparison result output in the step (d), synchronizing the input result with a clock signal and restoring the synchronized signal into a digital signal.

A data detection apparatus suitable for the above method comprises: first comparing means for receiving a reproduced analog signal, comparing the voltage level thereof with a first reference voltage of a predetermined level, and outputting a first comparison result; switching means for switching on and off in accordance with the first comparison result by being connected with the reproduced analog signal; reference voltage adjusting means for charging or discharging an input voltage in accordance with the on/off state of the switch in the switching means, and adjusting a second reference voltage of a predetermined level for data detection; second comparing means for receiving the reproduced analog signal, comparing the voltage level thereof with the second reference voltage adjusted in the reference voltage adjusting means, and outputting a second comparison result; and restoring means for receiving the second comparison result, synchronizing the received result with a clock signal, and restoring the synchronized signal into a digital signal.

BRIEF DESCRIPTION OF THE DRAWINGS

The above objects and advantages of the present invention will become more apparent by describing in detail a preferred embodiment thereof with reference to the attached drawings in which:

FIGS. 2A to 2M are operational waveforms of various parts of the apparatus shown in FIG. 1;

DETAILED DESCRIPTION OF THE INVENTION

Figure 1:
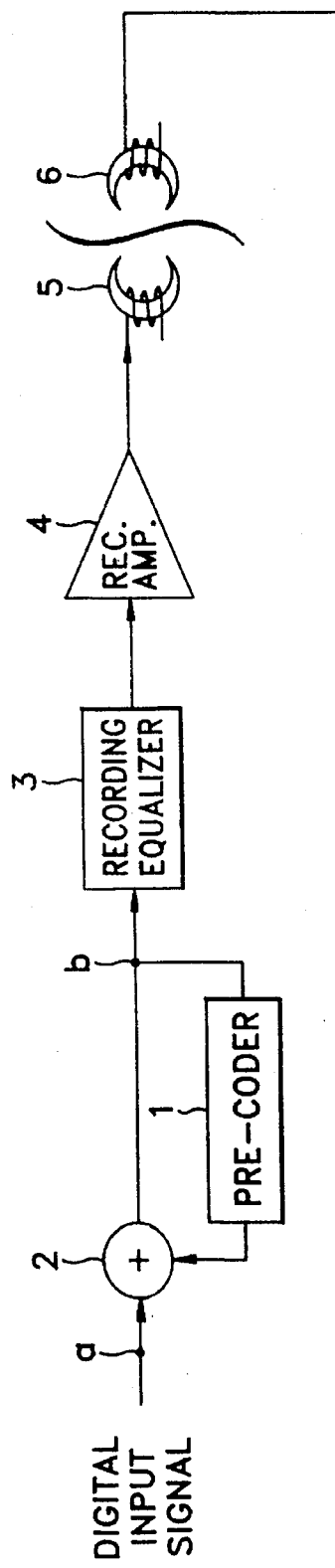
FIG. 1 is a block diagram of a conventional data detection apparatus for use in a digital recording/reproducing system.
Figure 1:
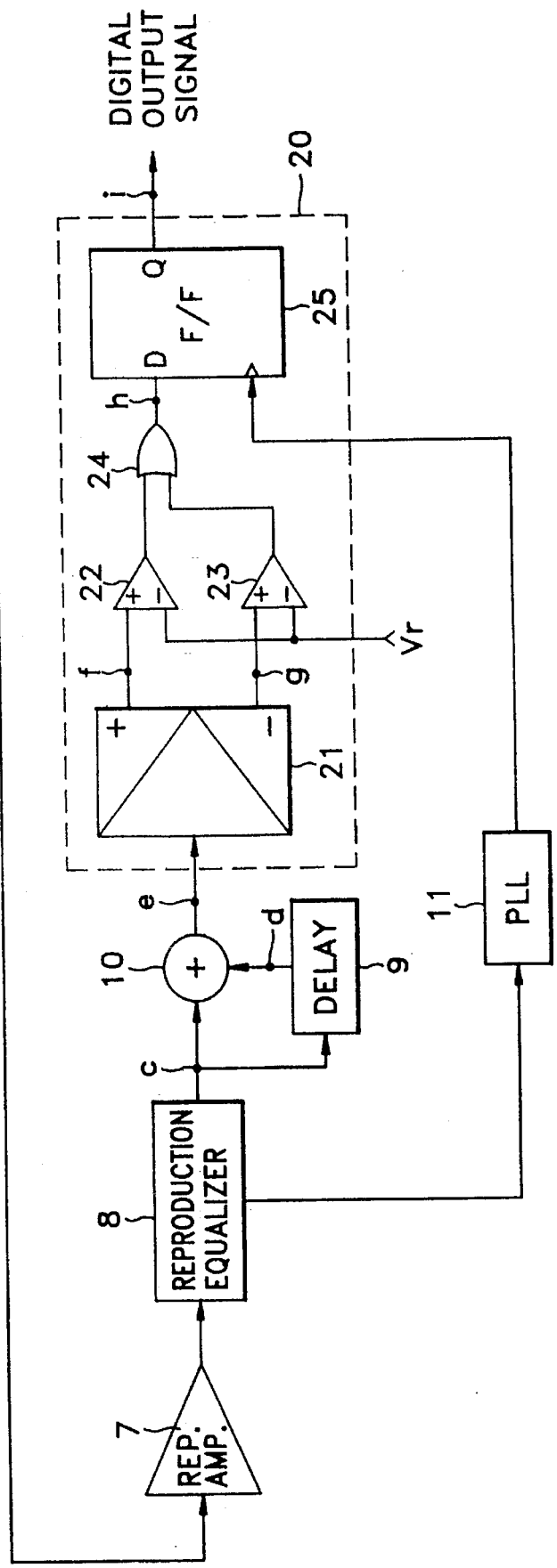
Figures 2K, 2L, 2M:
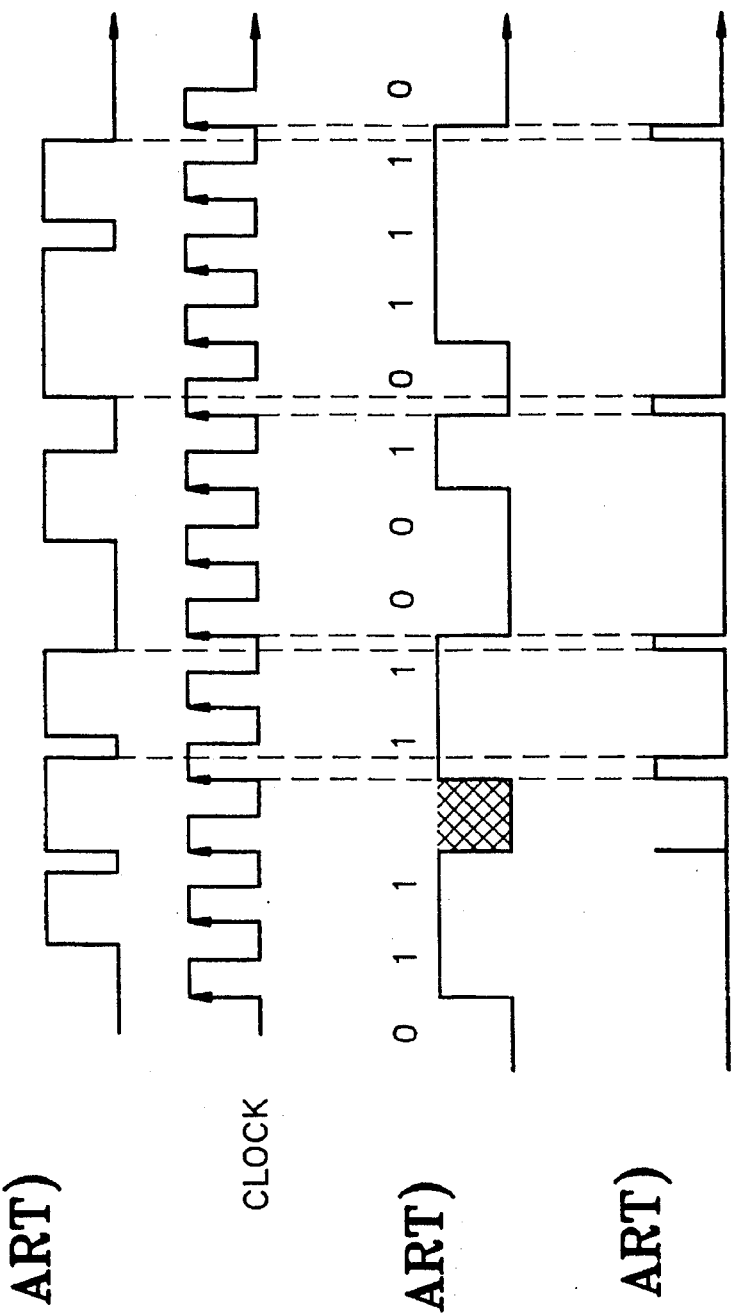

Hereinafter, those parts which are the same as those corresponding parts in FIG. 1 are designated by the same reference numerals, and their description will be omitted.

Figure 3:
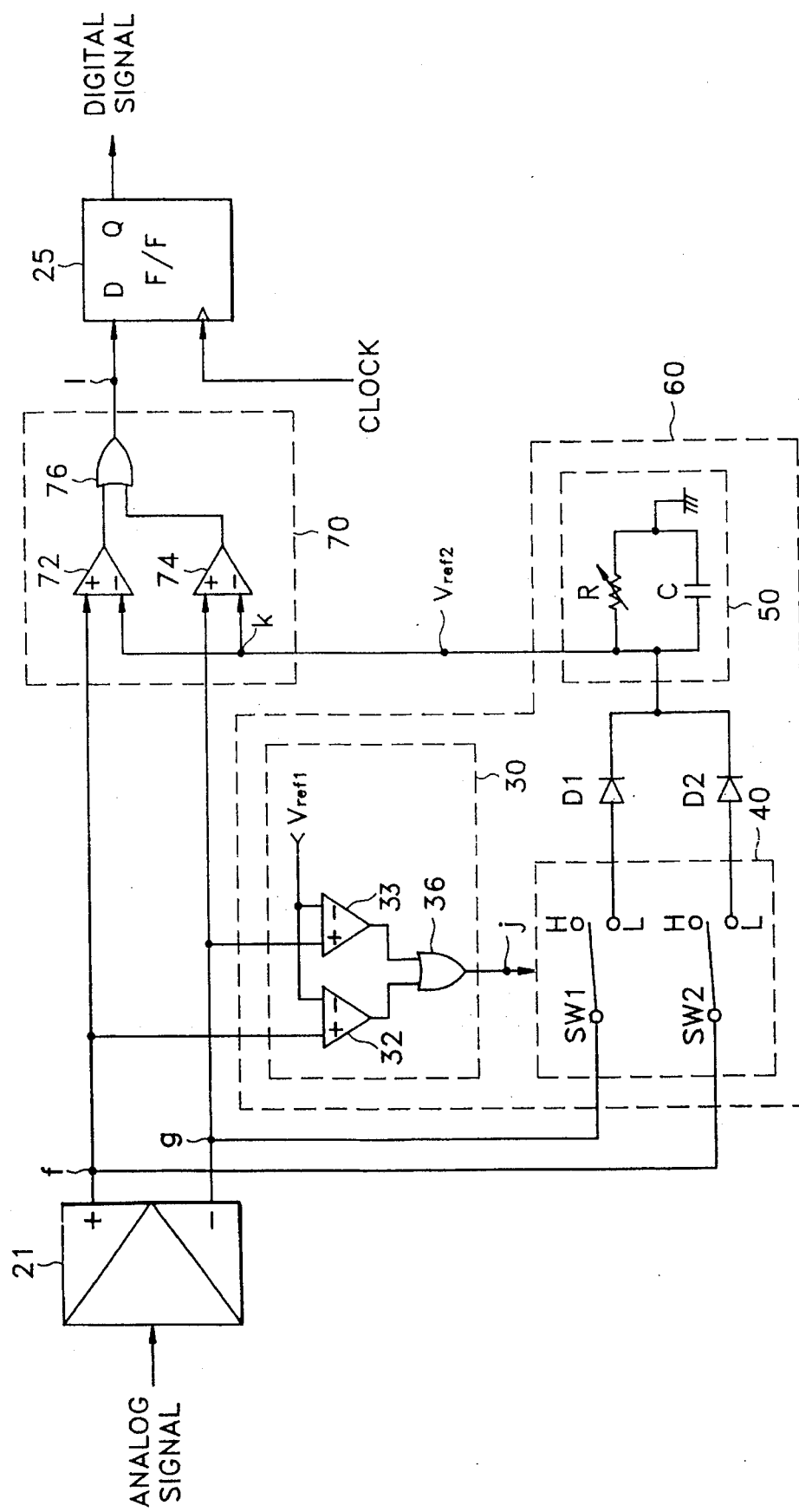
FIG. 3 is a block diagram of a data detection apparatus according to an embodiment of the present invention for use in a digital recording/reproducing system.

FIG. 3 is a block diagram of a data detection apparatus according to an embodiment of the present invention, for use in a digital recording/reproduction system, in which only data detector 20 is different from the components of the apparatus shown in FIG. 1.

Non-inverted signal f and inverted signal g output from differential amplifier 21 are input to each non-inverting input port (+) of first and second comparators 32 and 33. A first reference voltage $V_{ref1}$ of a predetermined level is applied to each inverting input port (−) of first and second comparators 32 and 33. The outputs of first and second comparators 32 and 33 are input to OR gate 36 to then output digital data j.

A first switch SW1 connects an inverting output port (−) of differential amplifier 21 and a diode D1. A second switch SW2 connects the non-inverting output port (+) of differential amplifier 21 and a diode D2. A reference voltage adjustment unit 50 connects diode D1 and diode D2 in parallel.

The non-inverted signal f and inverted signal g each output from differential amplifier 21 are input to each non-inverting input port (+) of third and fourth comparators 72 and 74. A second reference voltage $V_{ref2}$ output from reference voltage adjustment unit 50 is applied to inverting input port (−) of third and fourth comparators 72 and 74. OR gate 76 receives the outputs of third and fourth comparators 72 and 74 and performs an OR operation to then output the resultant signal l to D flip-flop 25.

A first comparing unit 30 having a first comparator 32, a second comparator 33 and an OR gate 36, compares an input signal with the first reference voltage $V_{ref1}$ and outputs a logic "high" if the voltage level of the input signal is larger than the first reference voltage $V_{ref1}$, to then turn off first and second switches SW1 and SW2. If the input signal is smaller than the reference voltage $V_{ref1}$, the first comparing unit 30 outputs a logic "low" to then turn on first and second switches SW1 and SW2. Diodes D1 and D2 rectify each signal input thereto. Reference voltage adjustment unit 50 charges an input voltage if a switching unit 40 is on, and discharges the input voltage if switching unit 40 is off. Accordingly, reference voltage adjustment unit 50 adjusts the second reference voltage $V_{ref2}$, for a data detection by repeated charging and discharging with respect to input signals. According to the digital data detection method as described above, since the detected data is varied depending on a data recording pattern and data recording method and system in use therefor, the magnitude of a reference voltage is adjusted by varying resistance R as shown in FIG. 3. Also, first comparing unit 30 prevents the second reference voltage $V_{ref2}$ from exceeding the first reference voltage $V_{ref1}$.

Second comparing unit 70 having third and fourth comparators 72 and 74 and OR gate 76 receives the second reference voltage $V_{ref2}$ adjusted by a reference voltage adjustment circuit 60 and an output signal of differential amplifier 21, and outputs digital data.

Figures 4A, 4B, 4C, 4D, 4E, 4F:
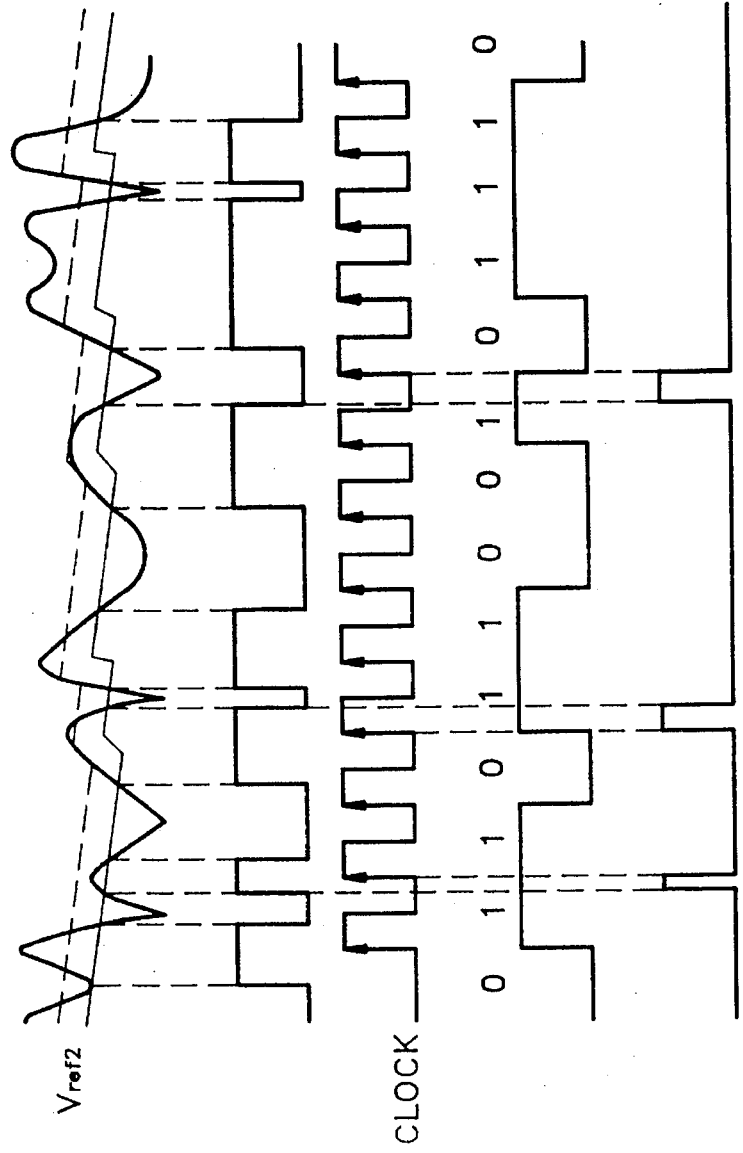
FIGS. 4A to 4F are operational waveforms of various parts of the apparatus shown in FIG. 3.

FIGS. 4A to 4F are operational waveforms of various parts of the apparatus shown in FIG. 3. FIG. 4A shows an input waveform of first comparing unit 30, and FIG. 4B shows an output waveform of first comparing unit 30 which corresponds to a signal j in FIG. 3. FIG. 4C is a charge and discharge curve of reference voltage adjustment unit 50 which depends on the magnitude of resistance of variable resistor R, where a solid line represents that the resistance is large and a dotted line represents that the resistance is small, and shows a signal k in FIG. 3. FIG. 4D shows an output waveform of second comparing unit 70, which corresponds to a signal l in FIG. 3. FIG. 4E shows an output waveform of D flip-flop 25 shown in FIG. 3, which corresponds to a signal restored from the analog signal, and FIG. 4F shows an error margin pulse. Referring to FIGS. 4E and 4F, it is understood that no error is generated and that the pulse width of the error margin is larger than that of the conventional method.

As described above, in a digital recording/reproduction system, the data detection method and the apparatus thereof according to the present invention can reduce the probability of error generation due to the jitter of reproduced signals and a clock by the repeated charging and discharging of a reference voltage adjustment unit, based on the voltage of input signals, to adjust the reference voltage for data detection.

What is claimed is:

1. A data detection method in a digital recording/reproduction system for recording a digital signal on a recording medium, for reproducing recorded data as an analog signal and for outputting said reproduced data as digital data, said method comprising the steps of:

(a) receiving said reproduced analog signal, comparing the voltage level thereof with a first reference voltage of a predetermined level and outputting a first comparison result;

(b) switching on and off a connection with said reproduced analog signal in accordance with said first comparison result output from said step (a);

(c) performing one of charging and discharging a charge element in accordance with the on/off state in step (b) and adjusting a second reference voltage of a predetermined level for data detection based on said charging and discharging;

(d) receiving said reproduced analog signal, comparing the voltage level thereof with said second reference voltage adjusted in said step (c) and outputting a second comparison result; and (e) receiving said second comparison result output in said step (d), synchronizing said second comparison result with a clock signal and restoring the synchronized signal into a digital signal.

2. A data detection apparatus of a digital recording/reproduction system for recording a digital signal on a recording medium, and for reproducing recorded data as an analog signal and outputting said reproduced data as digital data in a digital recording/reproduction system, said apparatus comprising:

first comparing means for receiving said reproduced analog signal, comparing the voltage level thereof with a first reference voltage of a predetermined level, and outputting a first comparison result;

switching means for switching on and off a connection with said reproduced analog signal in accordance with said first comparison result output from said first comparing means;

reference voltage adjusting means for charging or discharging a charge element in accordance with the on/off state of said switch in said switching means, and adjusting a second reference voltage for data detection;

second comparing means for receiving said reproduced analog signal, comparing the voltage level thereof with said second reference voltage adjusted in said reference voltage adjusting means, and outputting a second comparison result; and restoring means for receiving said second comparison result, synchronizing said received second comparison result with a clock signal, and restoring said synchronized signal into a digital signal.

3. A data detection apparatus for use in a digital recording/reproduction system as claimed in claim 2, wherein said reference voltage adjusting means adjusts said second reference voltage by charging the charge element if the voltage level of said reproduced analog signal is smaller than said first reference voltage and discharging the charge element if the voltage level of said reproduced analog signal is larger than said first reference voltage.

* * * * *